Aug. 15, 1950 T. D. ROBB ET AL 2,519,287
MULTIUNIT CALLING GROUP CONTROL CIRCUIT FOR PREVENTING OVERLOAD OF CURRENT AT SWITCHBOARDS
Filed May 22, 1947
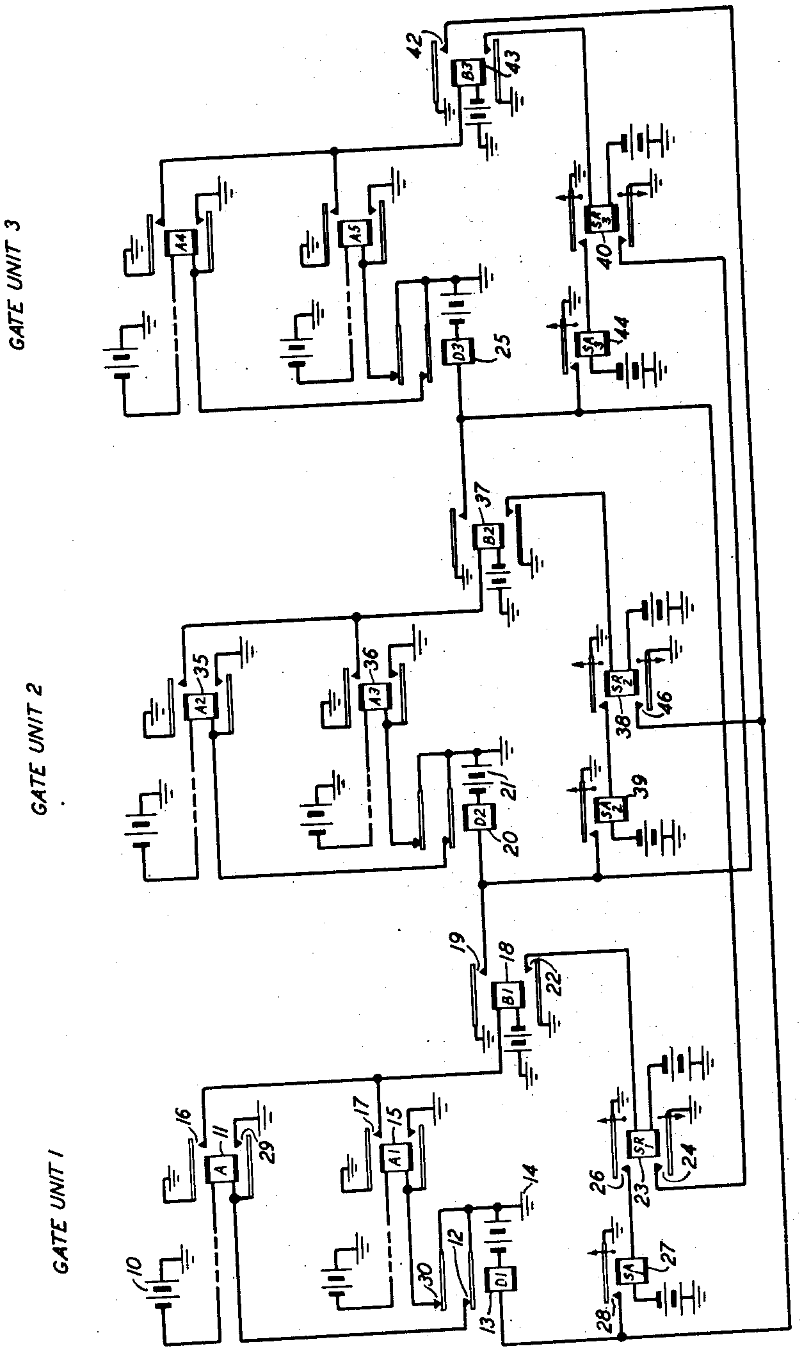
INVENTOR: T. D. ROBB
J. B. SHIEL
BY John E. Cassidy
ATTORNEY Patented Aug. 15, 1950 2,519,287

UNITED STATES PATENT OFFICE 2,519,287

MULTIUNIT CALLING GROUP CONTROL CIRCUIT FOR PREVENTING OVERLOAD OF CURRENT AT SWITCHBOARDS

Theodore D. Robb, Ridgewood, N. J., and John B. Shiel, Glen Head, N. Y., assignors to Bell Telephone Laboratories, Incorporated, New York, N. Y., a corporation of New York Application May 22, 1947, Serial No. 749,846

7 Claims. (Cl. 179—51)

This invention is an improved multiunit, calling group, control circuit, generally known in the communication switching art as a gate circuit for use particularly in communication switching systems. A gate circuit is a circuit which may be employed, for instance, to limit the number of incoming call signals which are displayed at an operator's position at any one time. A gate circuit may be employed to control operation of manual incoming trunk circuits in communication systems as well as to control many different kinds of electrical circuits in cases where the simultaneous operation of more than a limited number of the circuits would tend to cause difficulty.

Gate circuits may be employed advantageously and are illustrated herein in an arrangement for limiting the number of subscriber call signals which are displayed before an operator. In times of great public excitement it is well known that the number of telephone calls increases greatly. At such times a sudden drain of inordinate magnitude is placed upon the central telephone battery which on occasion causes the main fuse to blow out. In the case of manual offices a considerable portion of the battery drain results from the current required to be supplied to the filaments of the subscriber calling signal lamps. By restricting the number of lamps which may be displayed simultaneously the blowing out of the main fuse is prevented.

There is another difficulty attending the appearance in the switchboard of very large numbers of lighted subscriber lamps indicating large numbers of calls awaiting to be answered and that is that the operator has no means of knowing which calls have been waiting longest. Under such conditions some of the calls may go unanswered for long periods. The present invention alleviates this difficulty.

An object of the present invention is the improvement of calling signal arrangements in communication systems.

Another object of this invention is the improvement of gate circuits.

Another object of this invention is the provision of a multigate circuit.

A feature of this invention is the separation of the total number of circuits served by a gate circuit into fractional groups of the total and the provision of an individual gate circuit unit for each such fractional group.

A further feature of this invention is the operation of the gate units in sequence.

These and other features of the invention will become apparent from the following description when read with reference to the associated drawing which taken together disclose a preferred embodiment of the invention. It is to be understood that the invention is not limited to the disclosed preferred embodiment but may be incorporated in other forms which will readily suggest themselves to those skilled in the art. For a more complete understanding of the invention reference may now be had to the drawing.

It is assumed that the multiunit gate circuit is to be applied to the control of subscriber line circuits in a manually operated telephone exchange. A subscriber line circuit is individual to each subscriber line and its function is to control the subscriber line calling signal, usually an incandescent lamp, to summon the attention of the operator. For the purpose of allocating the subscriber line calling signals to the control of a multiunit gate circuit, the subscriber lines incoming to a particular operator's position are divided into groups. It will be assumed that the lines at a particular position are divided into three groups for association with a multiunit gate circuit having three units such as gate unit 1, gate unit 2, and gate unit 3 shown on the drawing. Each calling signal lamp individual to each subscriber line circuit in group 1, and similarly for the other groups and gate units, will be connected in a circuit which extends from battery, such as battery 10, through the filament of the line circuit calling lamp and a normally open contact of the line or calling relay in the particular subscriber line circuit, neither of which lamp or contact is shown, but which are intended to be represented by the dotted line, and through the winding of a relay, such as relay 11, individual to a particular subscriber line circuit and calling signal, through contact 12 of relay 13 to ground 14. When a call is initiated on the particular subscriber line circuit in group 1 associated with relay 11 in gate unit 1, the normally open contact mentioned above will be closed to light the associated lamp at a particular operator's position and to operate relay 11, provided relay 13 is unoperated, so as to enable the particular gate unit. When any relay such as relay 11 operates, it locks through a contact such as contact 29 to ground which replaces the ground through contact 12 of relay 13. Relay 13 is controlled, in a manner to be described, so that it is unoperated only at a certain momentary interval when gate unit 1 is to become effective. It will be assumed that it is presently unoperated. It will be assumed also that at the moment that relay 13 is unoperated, other calls in group 1 are in the waiting condition. As a result of this other relays, such as relay 15 in group 1, will also be operated and locked, as described for relay 11, simultaneously with the operation and locking of relay 11.

The operation of relay 11, individually, or of relay 11 and others, such as relay 15, associated with gate 1, collectively, will close contacts such as contacts 16 and 17. The closure of contacts such as contacts 16 or 17 will establish a circuit, or circuits in parallel, from ground through such contact or contacts as are closed and the winding of relay 18 to battery operating relay 18. The operation of relay 18 establishes a circuit from ground through contact 19 and the winding of relay 20 in gate unit 2 to battery 21 to hold relay 20 in the operated condition to maintain gate unit 2 in the disabled condition. It is pointed out that prior to the enabling of gate unit 1, gate unit 3 was enabled in the last preceding cycle of operation and while gate unit 3 was functioning relay 20 was held in the operated condition by the operated slow-to-release relay 40. This will be explained more fully hereinafter.

The operation of relay 18 will establish a second circuit from ground through contact 22 and the winding of relay 23 to battery operating slow-to-release relay 23. The operation of relay 23 establishes a circuit from ground through contact 24 and the winding of relay 25 in gate unit 3 to battery, to maintain relay 25 operated after the release of slow-to-release relay 44. The object of this is to maintain gate unit 3 in condition so that no incoming calls may be admitted therethrough until gate unit 3 is enabled on the succeeding cycle. The operation of relay 23 establishes a second circuit from ground through contact 26 and the winding of slow-to-release relay 27 to battery operating relay 27. The operation of relay 27 establishes a circuit from ground through contact 28 and the winding of relay 13 to battery. This circuit is effective to operate relay 13 at this time since contacts 42 and 46 are open.

Relay 13 is equipped with an individual contact, such as contacts 12 and 30 for each of the relays such as 11 and 15 individually associated with each subscriber line signal. It is emphasized that relays corresponding to relays 11 and 15 can be operated and the corresponding line lamps can be lighted, only during the interval while relay 13 is unoperated.

All subscriber line circuits in group 1 having calls incoming and awaiting answer at a particular moment when relay 13 is released, at which moment gate unit 1 is available, will operate and lock its relay, such as relays 11 and 15, simultaneously displaying each corresponding individual calling lamp in the switchboard.

The operator at the position where these particular lamps appear will respond to the calls. The response to the individual calling signals appearing simultaneously will be at random. As each call is answered the corresponding contact in the subscriber calling circuit which controls the lamp will be opened, releasing locked relays 11, 15, etc. one after another opening contacts 16, 17, etc. until, when the last of the calls is answered, all such relays will be released and all such contacts opened. Thereupon relay 18 is released. The release of relay 18 and the opening of contact 19 releases relay 20 as relays 39 and 40 in gate units 2 and 3 respectively are released at this time.

Each subscriber line circuit associated with group 2, which is in the calling condition when relay 20 is released, will operate and lock an individual relay, such as relays 35 and 36 in gate unit 2. This in turn causes the operation of relay 37 corresponding to relay 18 in gate unit 1 and effects in turn the operation of slow-to-release relays 38 and 39 and then the operation of relay 20, to prevent the inclusion of subsequently arriving calls from subscriber group 2 with those which have just now been admitted by gate unit 2, which admitted calls will presently be answered by the operator. It is particularly pointed out that calls incoming from any subscriber line circuit subsequent to the operation of relays such as 13 or 20, associated with the corresponding gate unit, cannot be served until the succeeding cycle of operation of the corresponding gate unit.

When relay 18 in gate unit 1 released, it also opened the circuit of slow-to-release relay 23. After an interval, sufficient to insure the operation of relay 37, through the operation of relays such as 35 and 36, relay 23 releases. Relay 25 in gate unit 3, however, which corresponds to relays 13 and 20 in gate units 1 and 2 respectively, is maintained operated by relay 37 to continue to disable gate unit 3. The release of slow-to-release relay 23 opens the circuit of slow-to-release relay 27 by opening contact 26. After an interval relay 27 releases, but not however before its function is assumed by relay 38 in gate unit 2, the operation of which, subsequent to the operation of relay 37, maintains relay 13 operated to continue the disabling of gate unit 1. In a similar manner relay 40 in gate unit 3, which corresponds to relays 23 and 38 in gate units 1 and 2, respectively, when operated in the cycle of operation of gate unit 3, performs the function of maintaining relay 20 operated so as to continue to disable gate unit 2 after slow-to-release relay 39 in gate 2 releases. Relay 13 in gate unit 1 is also under control of contact 42 of relay 43 of gate unit 3. After all calls in group 2 have been answered and relay 37 releases to release relay 25 and thereby enable gate unit 3, relay 43 will operate, in a manner which should be understood from the foregoing, to continue to maintain relay 13 operated, after the release of slow-to-release relay 38, to continue to disable gate unit 1.

From the foregoing it should be apparent that not more than one gate unit is ever in condition to light lamps in the switchboard at any one time. Further, each gate unit is arranged so that it is opened only momentarily to permit the passage of calls in a particular group which are waiting at the moment of the opening of the gate unit. Then the gate unit is closed while the calls admitted through the particular gate unit are answered. While one gate unit is thus functioning all other gate units of the multiunit gate circuit are completely disabled. To achieve the foregoing each relay such as 13 in each gate unit has as many controls as there are gate units, one in each gate unit. These controls are an operating relay such as 27 in the same gate unit as is relay 13 which maintains the relay such as 13 operated while calls from subscriber line circuits in the group such as 1 are being answered, a relay such as relay 38 in the next succeeding gate unit which maintains the relay such as 13 in the preceding group operated during the interval while the succeeding gate unit is in operation and a relay such as 43 in gate unit 3 which is effective to maintain relay 13 operated, and the associated gate unit disabled, while gate unit 3 is in operation. Gate unit 1, for instance, is effective to admit all waiting calls in group 1 only during the momentary interval while relay 13 is released, following the opening of contact 42 in gate unit 3 and until contact 28 closes.

It should be apparent also that the danger of blown fuses is minimized by limiting the number of calling lamps which may be lighted simultaneously to a small fraction of the total otherwise possible and it should also be obvious that excessive delays in answering any incoming call is avoided.

It is pointed out also that, while it is not essential ordinarily gate circuits are provided with relatively simple switching arrangements, well known in the art, which permit the subscriber line circuits to be operated normally without the gate circuits. The gate circuits are switched into operation in time of emergency.

What is claimed is:

1. In a communication system, a switching circuit for preventing overloading of an operator's position, said circuit comprising a plurality of unitary divisions, each of said divisions connectable to an individual group of the circuits constituting the load for said position, each of said groups comprising a plurality of individual incoming circuits, individual elements in each of said divisions connectable to individual circuits in corresponding groups, disabling means in each of said divisions, comprising a relay in each of said divisions and conductors interconnecting said relays, for preventing operative connection of said individual elements and said individual circuits in any of said divisions while another division is operatively connected to its respective group, and means, comprising a relay sequence circuit in said switching circuit, for operatively interconnecting each of said divisions in sequence to its respective group.

2. In a manual telephone switching system, a multiunit line calling signal control circuit, for preventing the simultaneous energization of an excessive number of incoming line calling signals in a communication switchboard, to prevent the blowing of fuses, said circuit comprising a plurality of units each connectable to a single individual group of said line calling signals, an individual signal control switch in each of said units for each said line calling signal in its respective group, an individual connection establishable between each said switch and its respective calling signal in each group for energizing said switch when its respective unit is enabled and a call is waiting on its respective incoming line, an individual enabling relay in each unit, a control circuit for said enabling relays for enabling said units in a fixed predetermined sequence, a sequence relay in each unit for controlling the enabling relay in the succeeding unit, and an individual connection between each of said signal control switches and the sequence relay in the same unit, so as to prevent the operation of the sequence relay and the enabling of any other unit until all calls waiting in an enabled unit have been answered.

3. A control circuit in accordance with claim 2, slow to release relays in each of said units, each sequence relay in each unit and each enabling relay in the same unit interconnected through said slow to release relays in the same unit.

4. A control circuit in accordance with claim 2, and relay means interconnecting said sequence relay in each particular unit and said enabling relay in the corresponding unit so as to actuate said enabling relay in each particular unit in response to the actuation of said sequence relay in the same particular unit.

5. A control circuit in accordance with claim 2, said circuit including also a relay control within each unit for the enabling relay in the same unit.

6. A control circuit in accordance with claim 2 in which each of said units includes an internal control within said unit for said enabling relay, and circuit interconnections between said internal control and said sequence relays in other units cooperating to enable each of said units successively for a short interval only, while said line signal control relays within a particular unit are actuated.

7. A communication switching system having a large plurality of line calling signals each individual to an incoming line, said signals subdivided into $n$ groups of smaller pluralities, a multiunit line calling signal control circuit having instrumentalities to prevent the simultaneous energization of an excessive number of said signals, so as to prevent the blowing of fuses, said control circuit comprising $n$ subcontrol units each connectable individually with a single one of said $n$ groups, a plurality of line calling signal control switches in each of said units, each signal control switch connectable individually to one of said line calling signals in its respective group, an enabling switch in each unit to enable its respective unit momentarily so as to energize said signals associated with lines in a respective group having incoming calls waiting at the moment of said enabling, a sequence relay in each of said units, a connection from each of said line signal control switches to said sequence relay in the same unit and an individual connection from each sequence relay to said enabling switch in the next succeeding unit, so as to prevent the operation of the sequence relay and the enabling of the next succeeding unit while any calling signal in an enabled unit remains unanswered.

THEODORE D. ROBB.
JOHN B. SHIEL.

REFERENCES CITED

The following references are of record in the file of this patent:

UNITED STATES PATENTS

| Number | Name | Date |
|---|---|---|
| 1,217,472 | McQuarrie | Feb. 27, 1917 |
| 1,427,695 | Morris | Aug. 29, 1922 |
| 1,427,725 | Cooper | Aug. 29, 1922 |
| 1,462,252 | Taggart | July 17, 1923 |
| 1,527,790 | Eastwood | Feb. 24, 1925 |
| 1,914,407 | Demarest | June 20, 1933 |
| 2,282,046 | Goldsmith | May 5, 1942 |
| 2,352,107 | Kessler | June 20, 1944 |
| 2,385,061 | Clark | Sept. 18, 1945 |